Sept. 3, 1929.   L. J. BROWN   1,726,884
RETAINING VALVE BRACKET
Filed Sept. 8, 1925
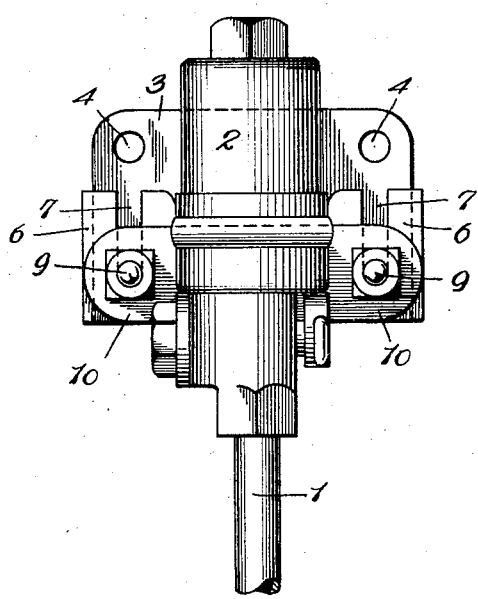
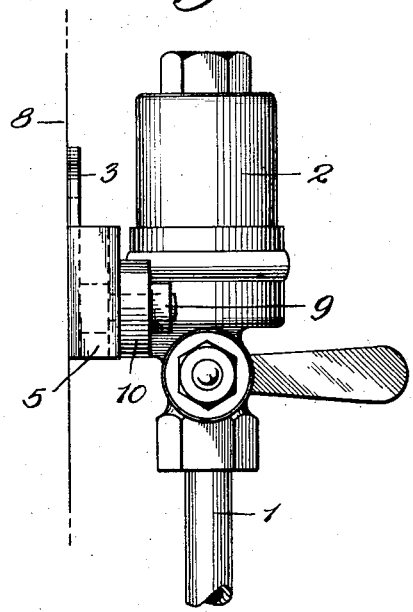
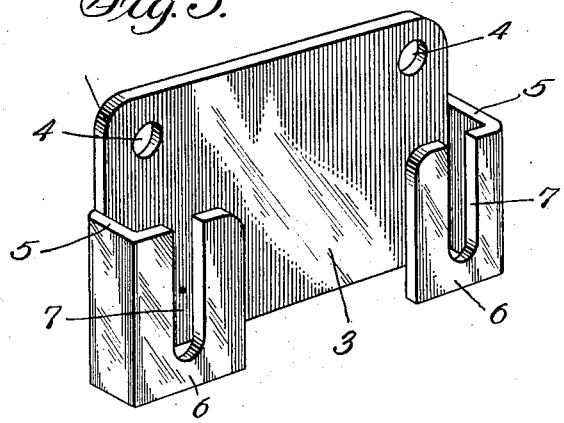
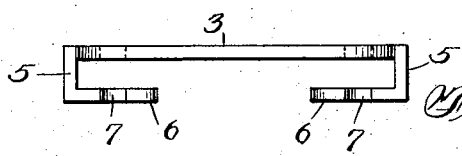
Inventor
Lloyd J Brown Patented Sept. 3, 1929.

1,726,884

UNITED STATES PATENT OFFICE.

LLOYD J. BROWN, OF EVANSTON, ILLINOIS, ASSIGNOR TO E. PAYSON SMITH, OF SPRINGFIELD, ILLINOIS.

RETAINING-VALVE BRACKET.

Application filed September 8, 1925. Serial No. 55,194.

Retaining valves are applied to cars to make movement of train safe, and to conserve the supply of air, and this valve, when set and in good working order, does not allow all of the air to escape from the brake cylinders, but retains a certain amount of pressure therein sufficient to hold the brakes in a set position, while the air is being replenished in the train line. When the air pressure in the line is increased or replenished, if the retaining valve is in an inoperative condition, the triple valve will automatically assume a released position allowing all of the air to escape from the brake cylinder, releasing the brakes, and allowing the train to gain momentum, and run out of control. It is, therefore, of the utmost importance that the retaining valve be in good working order at all times.

Retaining valves have in the past been secured to cars by lag screws and by bolts, the retaining valve being located on the outside at the end of the car and near the top of the car. When bolts are used, and this has been the most universal way of securing valves to the car, the bolts extend from the inside of the car, the nuts on the end of the bolt being on the outside of the car. This type of fastening has been found objectionable from many standpoints, in that the lag screws and bolts work loose to such an extent that the service movements of a car tend to give a sidewise movement to the retaining valve, which, with the pipe leading from the air brake system of the car, moves somewhat after the fashion of a pendulum. Such condition is prohibited by the United States safety appliance laws, inasmuch as it reduces the efficiency of the brake system, besides endangering the lives of trainmen. Another objection is that in case of bolts, the heads of which are on the inside of the car, if these bolts become loose during transit, the only way to get at the bolt is to unload the car, which can only be done at great expense, and sacrifices the safety of the goods removed from the car, and increases the liability of the railroad for damage and stolen goods.

The object of my invention is to provide a bracket adapted to be readily and securely fastened to the outside of the car, and of such construction that the retaining valve can be secured to and detached from the bracket without removing the bracket from the car.

Another object of my invention is to provide such a bracket with means whereby the pipe to which the valve is connected may vary in length, within reasonable variations, and within these variations the valve may be secured firmly to the anchoring bracket. In some instances the threads of the pipe may strip, requiring the shortening of the pipe and rethreading. My improved bracket takes care of such condition.

In the drawings:

Figure 1 is a front elevation of my improved bracket detached, with a retaining valve secured thereto.

Figure 2 is a side elevation of Figure 1.

Figure 3 is a perspective view of my improved bracket.

Figure 4 is a top plan view of Figure 3.

The reference numeral (1) designates the pipe leading from the air brake system of the car, and extending to a point near the top of the car, on the upper end of which is secured the retaining valve (2), the valve being positioned within convenient reach of the operator from the top of the car, or while standing on the usual car ladder.

My improved retaining valve anchoring bracket comprises a base (3) of suitable dimensions, and provided with bolt or rivet openings (4) near its upper corners, through which suitable bolts or rivets may pass to secure the anchor or bracket to the car. At each end, or side edge of the base plate, I integrally form an L shaped member consisting of a spacing member (5) at right angles to the base, and extending forwardly therefrom, at the outer edge of which is a plate (6) extending at right angles to the spacing member, and substantially parallel with the base, the plate (6) extending toward the center of the base. This plate is provided with an enlongated slot or bolt opening which intercepts the upper edge of the plate as clearly shown in Figure 3.

In applying the anchor to the car, bolts or rivets are passed through the car wall and the openings (4) of the base plate, and driven up tight to hold the anchor rigidly to the car wall (8).

The anchor is secured to the car wall, preferably, in such position relatively to the length of the pipe (1) that in the first application the bolts (9) are tightly fastened in the slots (7) near the top of the slot, so that in the event of the shortening of the pipe (1), for any reason whatever, the bolts (9) may be moved to lower positions in the slot (7).

The practice is for the operator to position the bolts (9) in the openings in the lugs (10) of the retaining valve loosely, after which the party assembling the valves on the car can with one hand place the valve in such position that the bolts (9) will readily slip within the slots (7), whereupon the operator can then securely fasten the valves in the desired position in the slot (7) by tightening up on the nuts of the bolts (9). It will be understood that, preferably, the heads of the bolts (9) are positioned between the base (3) and the plates (6), the idea being to have the slots (7) near enough to the spacing members (5) so that the bolt head will strike the spacing members (5), and thereby held against revolution while the nuts are being screwed home on the bolts.

What I claim is:

1. A retaining valve bracket comprising a base, a spacing member extending forwardly from each end of the base, and a hanger member extending from the outer end of each spacing member toward the center of the said base, and an elongated slot vertically disposed in each hanger member, said slot opening through the upper edge of the hanger members.

2. A retaining valve bracket comprising a base adapted to be secured to a support and provided with bolt-receiving openings, a spacing member extending forwardly from each vertically disposed edge of the base, and a hanger member extending from the outer vertical edge of each spacing member and disposed in a vertical plane forward of the base, each of said hanger members being provided with an elongated slot opening through the upper edge of said members and disposed downwardly.

3. A retaining valve bracket comprising a base adapted to be secured to a support, spacing members disposed vertically in spaced relation with each other and extending forwardly from said base, and a hanger member extending from the outer vertical edge of each spacing member in a vertical plane forward of the base, each hanger member having an elongated vertical slot opening through a horizontal edge of each of said members.

4. A retaining valve bracket comprising a base adapted to be secured to a support, spacing members disposed forwardly from each vertical edge of the base, a hanger member extending from the outer vertical edge of each spacing member, said hanger members being in a plane substantially parallel with the plane of the base, and means in the hanger member for receiving the anchor bolts of the retaining valve, said means being adapted to permit vertical adjustment.

5. A retaining valve bracket comprising a base adapted to be secured to a support, substantially L-shaped members at each end of the base and extending towards each other, one leg of each L-shaped member constituting a spacing portion while the other leg of each L-shaped member constitutes a valve attaching portion, and means in the last mentioned portion of each L-shaped member for receiving an anchor bolt.

In testimony whereof I affix my signature.

LLOYD J. BROWN.